H. BUISSON.
GRAIN SEPARATOR.
APPLICATION FILED JUNE 4, 1914.
1,178,295.
Patented Apr. 4, 1916.
2 SHEETS—SHEET 1.
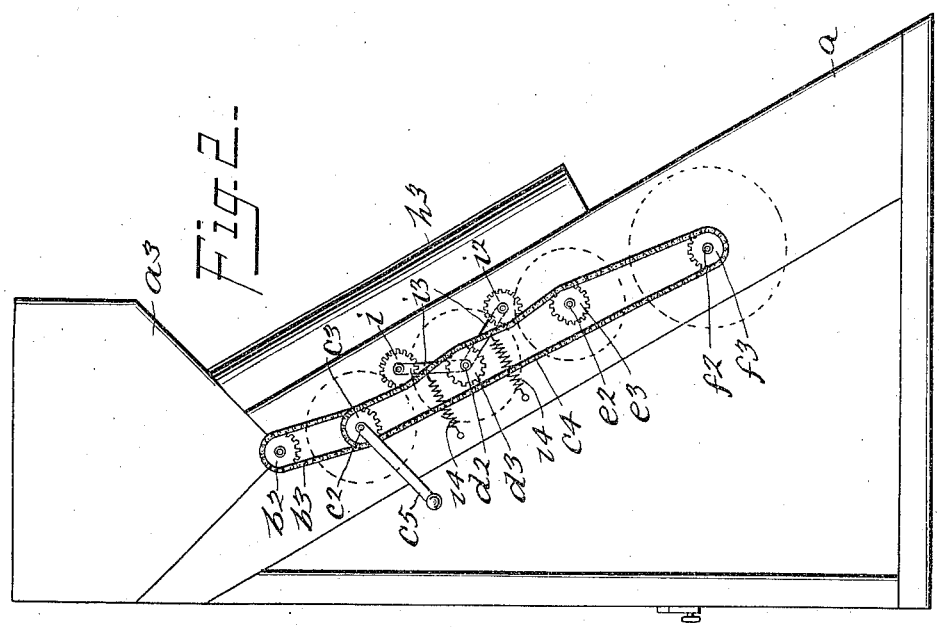
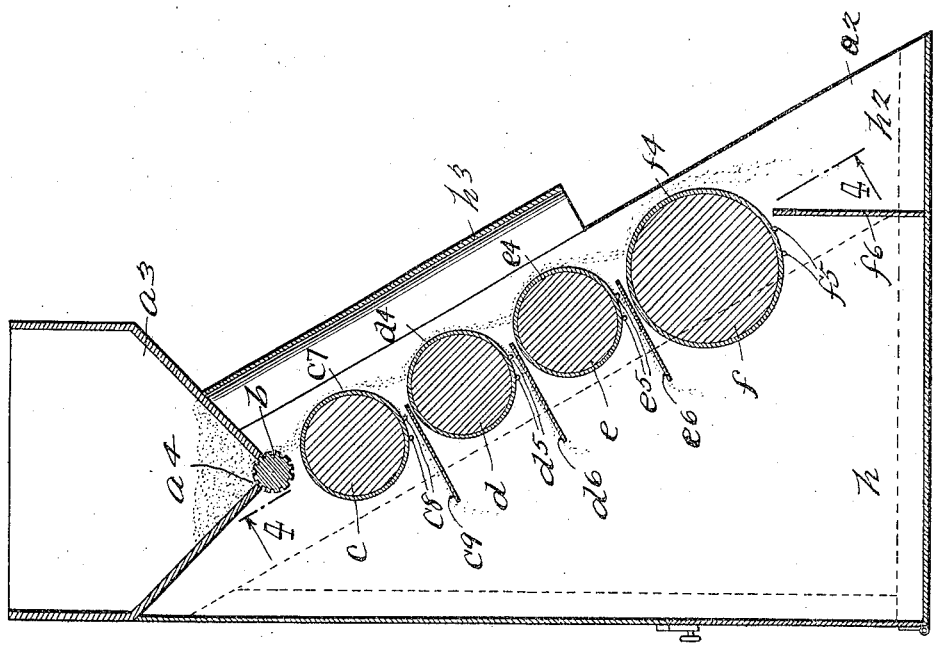
WITNESSES
George L. Blume.
J. E. Larsen
INVENTOR
Henry Buisson
BY Munn & Co
ATTORNEYS H. BUISSON.
GRAIN SEPARATOR.
APPLICATION FILED JUNE 4, 1914.
1,178,295.
Patented Apr. 4, 1916.
2 SHEETS—SHEET 2.
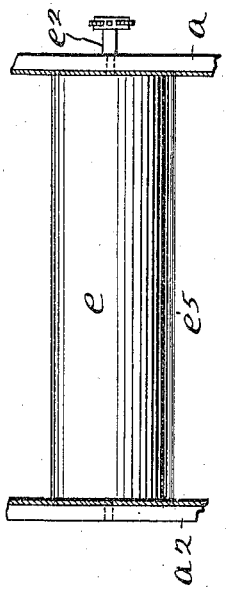
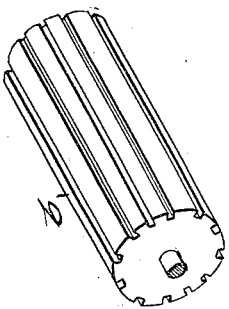
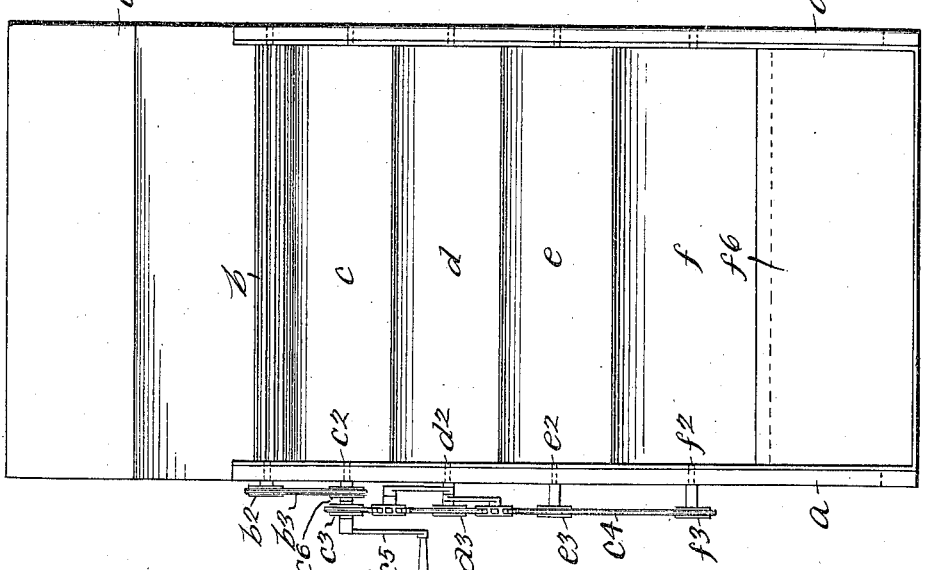
WITNESSES
George L. Blume.
J. E. Larsen
INVENTOR
Henry Buisson
BY Munn & Co
ATTORNEYS

UNITED STATES PATENT OFFICE.

HENRY BUISSON, OF FORT TOTTEN, NORTH DAKOTA.

GRAIN-SEPARATOR.

1,178,295.  Specification of Letters Patent.  Patented Apr. 4, 1916.

Application filed June 4, 1914. Serial No. 842,906.

*To all whom it may concern:*

Be it known that I, HENRY BUISSON, a citizen of the United States, and a resident of Fort Totten, in the county of Benson and State of North Dakota, have invented certain new and useful Improvements in Grain-Separators, of which the following is a specification.

My invention relates to the separation of the bad from the good grains, in agricultural activities, and the main object thereof is to provide mechanical means for accomplishing this result.

A further object is to provide a machine for this purpose which is readily operated by hand, but which may also be power driven.

A further object is to provide such a machine which is easily portable, whereby it may be moved to suitable places for use.

A further object is to provide such a machine which embraces a plurality of rollers, angularly superimposed, scrapers therefor, and troughs or the like for carrying the separated grain.

A further object is to provide a hopper for the grain to be treated, and also to provide a feed for the grain; and a further object is to provide means for actuating said feed and all of said rollers simultaneously.

My invention is fully described in the following specification, of which the accompanying drawings form a part, in which the same reference characters are used to designate the same parts in each of the views, and in which:—

Figure 1 is a vertical section taken through my device, and showing the relationship of the parts; Fig. 2 is a side elevation thereof, and showing the operating means; Fig. 3 is a front view thereof, with a guard which I employ removed; Fig. 4 is a partial section taken on the line 4—4 of Fig. 1; and Fig. 5 is a perspective view of the feed roller, removed from the machine.

In the drawings forming a part of this application I have shown a frame composed of vertical, inclined, side members $a$ and $a^2$, having a hopper $a^3$ in the upper part thereof, open at its bottom at $a^4$ and which opening is closed by means of a fluted feed wheel $b$ having shaft ends carried by said side members $a$ and $a^2$, one end of which, at the side member $a$, having a sprocket $b^2$ thereon and over which passes a chain $b^3$.

Arranged beneath the feed wheel $b$, and carried by the side members $a$ and $a^2$, are a plurality of spaced rollers $c$, $d$, $e$ and $f$, four in number as shown but which may be of any desired number, and each of which is provided with a shaft, $c^2$, $d^2$, $e^2$, and $f^2$ provided with a sprocket each, $c^3$, $d^3$, $e^3$ and $f^3$, respectively, and with all of which a chain $c^4$ is engaged, the shaft $c^2$ also carrying a crank-handle $c^5$ and a sprocket $c^6$ with which the chain $b^3$ is engaged. Each of the rollers is covered with cloth or other suitable material calculated to have the lighter grains stick thereto, as shown at $c^7$, $d^4$, $e^4$, and $f^4$, and I provide wires $c^8$, $d^5$, $e^5$ and $f^5$, transversely arranged in the frame, and bearing on the rollers $c$, $d$, $e$, and $f$, respectively, preferably at the lower sides thereof, and I also provide troughs $c^9$, $d^6$, $e^6$ and $f^6$ for the respective rollers, the last of which is, in the form shown, merely a partition between the compartments $h$ and $h^2$, and I also provide a light metal guard $h^3$ to prevent the grain from being thrown beyond the three upper rollers, previous to its complete separating treatment.

As clearly shown at $i$ and $i^2$, Fig. 2, I provide chain tension sprockets or rolls for the chain $c^4$, carried by suitable arms $i^3$ having springs $i^4$ connected therewith and whereby said tension sprockets are maintained in contact with the chain, but any suitable equivalent may be provided for this purpose.

The grain is dumped into the hopper, as will be understood, and the actuation of the crank-handle $c^5$ to the right will first feed the grain to the roller $c$; thence to the rollers $d$, $e$ and $f$ successively, and the lighter grains which it is desired to separate from the good grain adheres to the cloth coverings of the respective rollers until the corresponding wires $c^8$, $d^5$, $e^5$ and $f^5$ scrape the same from the rollers into the corresponding troughs $c^9$, $d^6$, and $e^6$, whence said bad grain passes to the compartment $h$ and the good to the compartment $h^2$, separated by the trough or partition $f^6$, and said separation is thus easily and quickly performed, and, although not shown, I may employ a grain feed regulator, in the hopper, if desired.

My invention is very simple, though highly efficient, and, while I have shown certain specific details of construction to make the operation clear, I do not desire to limit myself thereto, but may make any desired changes in and modifications of the form shown and described, within the scope of the following claim, without departing from the spirit of my invention, or sacrificing its advantages and, reserving the right to all such changes,

What I claim as new, and desire to secure by Letters Patent, is:—

A grain separator comprising a frame, an inclined series of superimposed separated rollers mounted in said frame, inclined troughs extending between each pair of rollers and scrapers between the rollers and above the upper ends of said troughs.

In testimony whereof I have signed my name to this specification in the presence of the subscribing witnesses.

HENRY BUISSON.

Witnesses:
HARRY W. CAMP,
K. A. VEIX.

Copies of this patent may be obtained for five cents each, by addressing the "Commissioner of Patents, Washington, D. C."